G. B. Durkee,
Snap Hook,
N⁰ 69,548.        Patented Oct. 8, 1867.
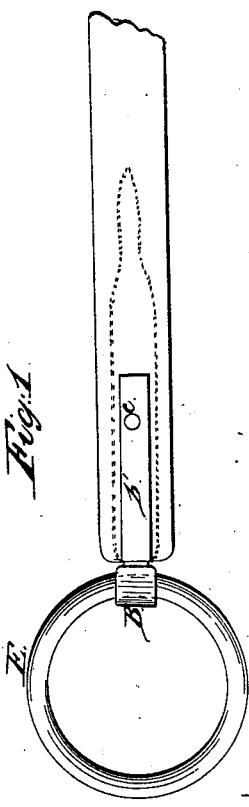
Witnesses:
B. H. Murhle,
F. W. Sanguurthy.
Inventor,
Geo. B. Durkee

United States Patent Office.

GEORGE B. DURKEE, OF ALDEN, NEW YORK.

Letters Patent No. 69,548, dated October 8, 1867.

---

IMPROVED HARNESS-SNAP.

---

*The Schedule referred to in these Letters Patent and making part of the same.*

---

TO ALL WHOM IT MAY CONCERN:

Be it known that I, GEORGE B. DURKEE, of Alden, in the county of Erie, and State of New York, have invented a certain new and improved Harness-Snap; and I do hereby declare that the following is a full and exact description thereof, reference being had to the accompanying drawings, making a part of this specification, in which—

Figure I is a front view of the same, in connection with strap and ring.

Figure II is another front view of same, disconnected therefrom.

Figures III and IV are longitudinal sections, showing the hook open and closed respectively.

The nature of this invention consists, first, in a harness-snap, the hook of which is hinged upon the inside of a hollow tube, and projects from said tube in a manner that, when the hook is in one extreme position, it will entirely cover the open end of the tube, and when it swings upon its fulcrum into the opposite position, the hook will lap over the edge of the tube, and permit the introduction therein of the ring or other part of the harness to which the snap is to be connected, a spring being attached to the hook upon the inside of the tube for the purpose of keeping the said hook closed, or in the position first above described; second, in a harness-snap, the main body of which is a tube, or equivalent, and the hook is hinged to said tube or equivalent in such manner that the end of the tube forms, or serves the purpose of, a stop for the hook.

Letters of like name and kind refer to like parts in each of the figures.

A represents the main body of my improved harness-snap, which consists of a hollow tube, either round, oval, or rectangular in its cross-section, as may be preferred. This tube is made smaller and flat at one end, and is attached to the strap or other part of a harness, substantially in the manner shown in Fig. I. B represents the hook. It consists of a semicircular flat loop, having a shank, $b'$, the end of which is hinged upon the inside of the tube A, by means of a rivet, as shown at $c$. By this means the hook may swing upon the hinge $c$ as a fulcrum, and be placed either in the position shown in Fig. III, or in that represented in Fig. IV. A spring, D, is placed within the tube A in a manner to retain the hook in the position shown in Fig. III. The opening of the semicircular hook is thus closed by means of the tube A, and if the snap is hooked on to a ring, E, as shown in Fig. I, it is impossible by any movement of the strap to open the hook and disengage it from the ring. Whenever it is desired to do so, the hook is pressed upon by the finger in a manner to move it into the position shown in Fig. IV, thereby opening the hook, whereupon the ring E may be readily removed. The spring D within the tube may be of any desired shape, and applied and attached in any convenient manner without departing from the principle of this invention. The essential and most apparent difference between this harness-snap and others consists in that the main body A constitutes the stop, and the hook B is movable thereon, while in others the hook is a part of the main body and the stop-lever movable.

My improved harness-snap may be entirely covered with leather, and be used upon the head-stall of a harness in lieu of buckles, so that the same can be taken apart for cleaning purposes, and put together in a very few moments.

What I claim as my invention, and desire to secure by Letters Patent, is—

A harness-snap composed of the tube A, or equivalent, hinged hook B, and spring D, constructed, arranged, and operating substantially as herein described.

GEO. B. DURKEE.

Witnesses:
B. H. MUEHLE,
F. A. LANGWORTHY.